(12) United States Patent
Ackley

(10) Patent No.: US 10,504,111 B2
(45) Date of Patent: Dec. 10, 2019

(54) SECURE MOBILE DEVICE TRANSACTIONS

(71) Applicant: Intermec IP Corp., Everett, WA (US)

(72) Inventor: H. Sprague Ackley, Seattle, WA (US)

(73) Assignee: INTERMEC IP CORP., Everett, WA (US)

( * ) Notice: Subject to any disclaimer, the term of this patent is extended or adjusted under 35 U.S.C. 154(b) by 320 days.

(21) Appl. No.: 13/802,431

(22) Filed: Mar. 13, 2013

(65) Prior Publication Data

US 2014/0180850 A1 Jun. 26, 2014

Related U.S. Application Data

(60) Provisional application No. 61/745,463, filed on Dec. 21, 2012, provisional application No. 61/751,150, filed on Jan. 10, 2013.

(51) Int. Cl.
*G06Q 20/40* (2012.01)
*G06Q 20/32* (2012.01)
*H04M 1/725* (2006.01)
*H04W 12/06* (2009.01)
*H04W 4/80* (2018.01)

(52) U.S. Cl.
CPC ......... *G06Q 20/40* (2013.01); *G06Q 20/3274* (2013.01); *H04M 1/72522* (2013.01); *H04W 4/80* (2018.02); *H04W 12/06* (2013.01)

(58) Field of Classification Search
CPC ..... G06Q 20/40; G06Q 20/3274; H04W 4/80; H06M 1/72522
USPC ....... 705/16, 18, 21, 44, 26.41, 39; 235/380; 340/5.6
See application file for complete search history.

(56) References Cited

U.S. PATENT DOCUMENTS

| | | | | |
|---|---|---|---|---|
| 7,512,567 B2 * | 3/2009 | Bemmel | ................ | G06Q 20/20 705/64 |
| 8,316,237 B1 * | 11/2012 | Felsher | ................ | H04L 9/0825 380/282 |
| 8,407,097 B2 * | 3/2013 | Sperduti | ................ | G06Q 20/20 705/16 |
| 8,924,712 B2 * | 12/2014 | Varadarajan | ....... | G06Q 20/3276 713/155 |
| 2007/0125840 A1 * | 6/2007 | Law | ....................... | G06Q 20/10 235/379 |
| 2007/0136573 A1 * | 6/2007 | Steinberg | ................ | G06F 21/32 713/155 |
| 2008/0154770 A1 * | 6/2008 | Rutherford | ............ | G06Q 20/04 705/44 |
| 2009/0138366 A1 * | 5/2009 | Bemmel | ................ | G06Q 20/20 705/17 |
| 2009/0327131 A1 * | 12/2009 | Beenau | ................ | G06Q 20/32 705/44 |

(Continued)

*Primary Examiner* — Vanel Frenel
(74) *Attorney, Agent, or Firm* — Oliff PLC; R. Brian Drozd

(57) ABSTRACT

Systems and methods are described for communicating private user information from a mobile device to a transaction terminal or other external device. More specifically, systems and methods are described for improving authentication through the use of mobile devices used to facilitate transactions with external devices. The authentication described herein can be adaptive, thereby providing a flexible level of automatic on-the-spot transaction security. Unlike prior art systems, the mobile device is not required to have network connectivity. Additionally, the systems and methods described herein are easily adapted to most current systems.

15 Claims, 8 Drawing Sheets

(56) References Cited

U.S. PATENT DOCUMENTS

| | | | |
|---|---|---|---|
| 2010/0203698 A1* | 8/2010 | Wirbeleit et al. | 438/305 |
| 2010/0214058 A1* | 8/2010 | Walker | 340/5.6 |
| 2010/0268648 A1* | 10/2010 | Wiesman et al. | 705/44 |
| 2011/0270694 A1* | 11/2011 | Halim | 705/18 |
| 2012/0179558 A1* | 7/2012 | Fischer | 705/16 |
| 2012/0265623 A1* | 10/2012 | Zhu | G06K 7/1095 |
| | | | 705/16 |
| 2012/0266227 A1* | 10/2012 | Colson | 726/7 |
| 2013/0138563 A1* | 5/2013 | Gilder | G06Q 20/4016 |
| | | | 705/44 |
| 2013/0214044 A1* | 8/2013 | Sperduti et al. | 235/383 |
| 2013/0248596 A1* | 9/2013 | Arora et al. | 235/380 |
| 2014/0040139 A1* | 2/2014 | Brudnicki | G06Q 20/227 |
| | | | 705/44 |
| 2014/0172724 A1* | 6/2014 | Dua | G06Q 20/20 |
| | | | 705/76 |
| 2015/0317625 A1* | 11/2015 | Hammad | G06F 21/34 |
| | | | 705/67 |

* cited by examiner

SECURE MOBILE DEVICE TRANSACTIONS

CLAIM OF PRIORITY

This application claims priority to U.S. Provisional Patent Application No. 61/745,463 entitled "MOBILE DEVICE CONNECTION SECURITY," which was filed on Dec. 21, 2012, and U.S. Provisional Patent Application No. 61/751,150 entitled "SECURE MOBILE DEVICE TRANSACTIONS," which was filed on Jan. 10, 2013, the contents of both of which are expressly incorporated by reference herein.

BACKGROUND

Mobile device use has become near-ubiquitous, with only a small fraction of individuals not carrying at least one mobile device such as a PDA, a smart phone, a Blackberry, a tablet computer, an iTouch device, a palmtop computer, a mobile gaming system, etc. In addition to carrying one or more mobile devices, individuals must also carry other everyday person items such as credit cards, keys, etc., and non-everyday items such as airplane boarding passes, concert tickets, etc.

In recent years, efforts have been made to consolidate these items into mobile devices. For example, a bar code displayed on a mobile phone can now be used in lieu of a printed hard-copy boarding pass. This mobile boarding pass technology is generally secure, however, it requires that the device have Internet connectivity. That is, the current technology requires a secure input (e.g., traveler access airline website) and a secure output (e.g., cloud transmission of a unique bar code to traveler's mobile device). While there have been no documented false entries to an air terminal, on-the-spot manual traveler authentication or identification is still required (i.e., airline personnel need to double check the traveler's photo ID to ensure proper identification).

Other efforts to consolidate cards or tickets into mobile devices simply require display of the bar code on a mobile device to access an account. For example, a user with the electronic Starbuck's loyalty card merely needs to display the bar code on the mobile device in order to access the user's pre-paid account. No other verification is required. That is, money is already registered securely in an account on the Starbuck's website and thus, anyone finding the mobile device can order a latte.

Consequently, many mobile transactions are not secure, and the mobile transactions that are secure currently require manual security and/or network capabilities that cannot be easily adapted to most current systems. For example, smart phones (i.e., phones with network capabilities such as, for example, internet access and or text capability) are required to facilitate current secure transactions. Accordingly, a need exists for a system that overcomes the above problems, as well as one that provides additional benefits.

Overall, the examples herein of some prior or related systems and their associated limitations are intended to be illustrative and not exclusive. Other limitations of existing or prior systems will become apparent to those of skill in the art upon reading the following.

BRIEF DESCRIPTION OF THE DRAWINGS

Examples of solutions for improving authentication of mobile devices to facilitate various transaction are illustrated in the figures. The examples and figures are illustrative rather than limiting.

DETAILED DESCRIPTION

Figure 1:
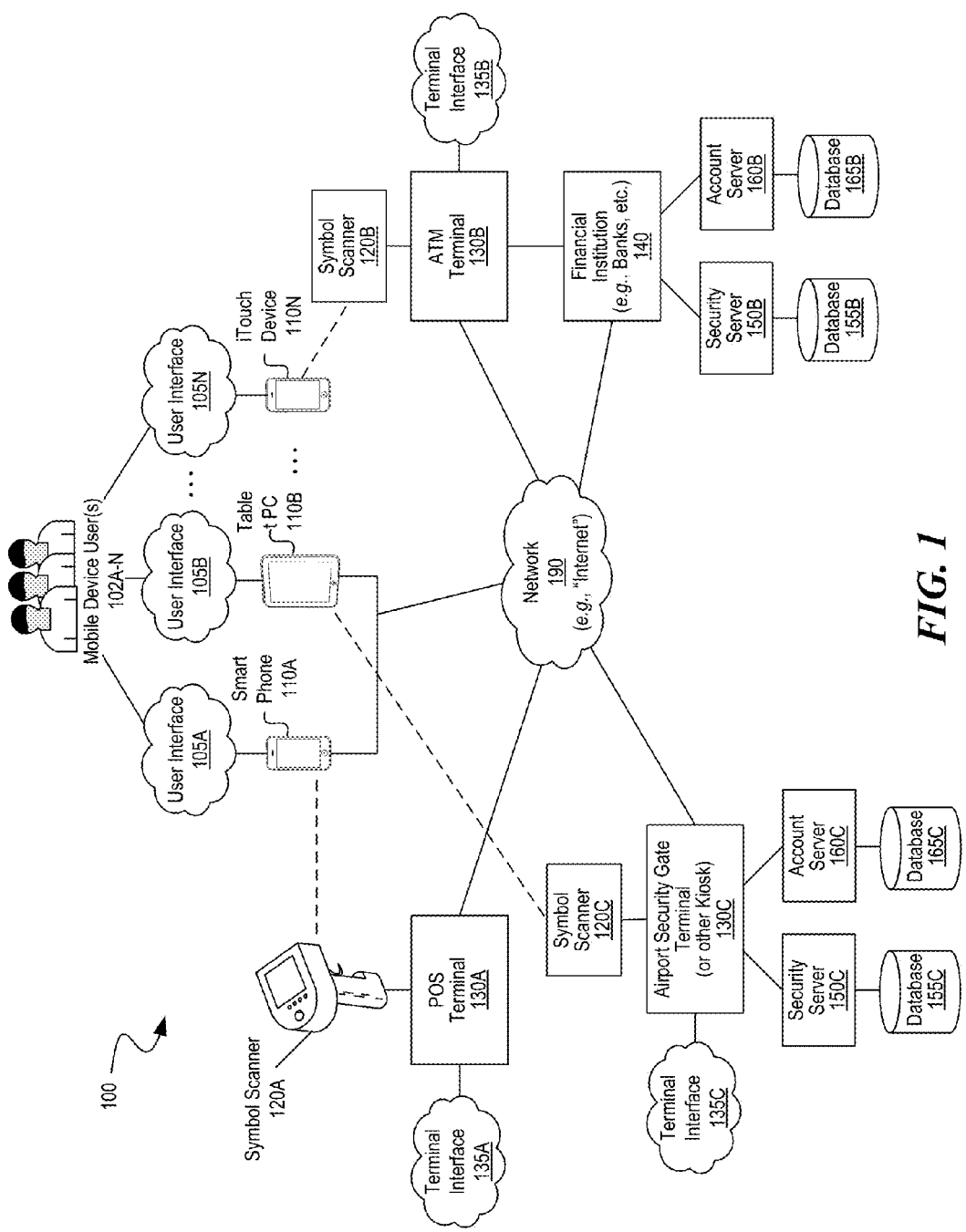
FIG. 1 depicts a block diagram illustrating an example environment that can facilitate improved authentication of mobile device transactions.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Systems and methods are described for communicating private user information from a mobile device to a transaction terminal or other external device. More specifically, systems and methods are described for improving authentication through the use of mobile devices used to facilitate transactions (e.g., through one or more communications) with transaction terminals/external devices. The authentication described herein can be adaptive, thereby providing a flexible level of automatic on-the-spot transaction security (e.g., terminal level security). Additionally, unlike prior art systems, the mobile device is not required to have connectivity (i.e., a voice/data connection and/or other internet capabilities).

In one embodiment, the systems and methods provide for the ability to consolidate cards (including, but not limited to, credit cards and smart cards), tickets and keys (including, but not limited to, house keys, office keys, and car keys) while providing for secure use of mobile devices for financial, access control, venue identity, loyalty, membership and coupon applications. Accordingly, this invention solves the problem of having a different method or card for nearly every transaction by combining all applications into a mobile device and one or more mobile device applications. Additionally, this invention also solves the problem of using personal mobile devices for financial and access control applications without requiring a major (e.g., hardware) modification to the mobile device or a cloud based transmission service (e.g., existing devices and infrastructure can be utilized).

In one embodiment, a mobile device utilizes a symbol generator (e.g., alphanumeric to bar code converter) to produce an image of a bar code on the device screen which can be used to communicate various private user information to a transaction terminal. The communication via the symbol facilities private data communication as it is impossible to wirelessly "sniff" the information contained in the symbol. Additionally, this method of communication removes the need for mobile internet connectivity, potentially reduces the complexity of terminals (including ATMs), and eliminates the need to touch unsanitary public keypads or screens. Furthermore, mobile device communication via symbols is very simple and inexpensive as it requires very little or no modification to existing systems.

Various private user information can be transferred via various successive bar codes that are generated by the mobile device. For example, initial private user information including credit card information can be encoded in a first bar code and subsequent private user information including responses to inquiries by the terminal can be included in subsequent bar codes.

A terminal can utilize enhanced security methods. The security methods described herein provide for cost effective means (e.g., using bar code scanners or imagers/cameras already deployed) that provide a flexible level of security up to and/or exceeding a level of current chip-on-card technologies (i.e., smart cards) that is easy to use, prevents fraudulent access and detects stolen devices usage. In one embodiment, the enhanced security methods include the transaction terminal being able to query or otherwise interrogate a user for on-the-spot transaction security (i.e., authentication). The authentication can include a series of challenge questions.

In one embodiment, a user's transaction pattern can be tracked and/or otherwise maintained and accessed. Transactions that do not fit the pattern can trigger use of the security policy (or escalation of the security policy). For example, use of the security policy can include use of challenge questions. Similarly, escalation of the security policy can include use of additional challenge questions.

Although the examples described herein are primarily directed to symbols (e.g., bar codes), other short range communication technologies such near field communications (NFC), Radio-frequency identification (RFID) or other short range technologies could alternatively or additionally be utilized by the systems and methods described herein.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirement for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Representative Environment

FIG. 1 depicts a block diagram illustrating an example environment 100 that can facilitate improved authentication of mobile device transactions and/or communications. The example environment 100 includes multiple mobile devices 110 (e.g., smart phone 110A, table PC 110B, and iTouch™ device 110N), multiple symbol readers (or scanners) 120, multiple terminals 130 (e.g., point of sale (POS) terminal 130A, ATM terminal 130B, airport security gate terminal 130C), a financial institution 140 and a network 190. As shown, each terminal 130 may have an associated security server 150 and/or account server 160. The servers 150 and 160 may each be associated with one or more databases 155 and 165, respectively.

The mobile devices 110 can be any system, device, and/or any combination of devices/systems that is able to receive input from a user, generate a symbol based on the input, and display or otherwise convey the symbol to a symbol scanner 120. The mobile devices 110 typically include respective user interfaces 105. The user interfaces 105 can include one or more input devices and a display or other output functionalities to present data exchanged between the mobile device 110 and a mobile device user 102. The user interfaces 105 can also be used to convey symbols for reading or scanning by the symbol scanners 120.

The mobile devices 110 can include, but are not limited to, portable devices including, notebook computers, laptop computers, handheld computers, palmtop computers, mobile phones, cell phones, smart phones, PDAs, Blackberry devices, Treo devices, handheld tablets (e.g. an iPad, a Galaxy, Xoom Tablet, etc.), tablet PCs, thin-client devices, hand held consoles, hand held gaming devices or consoles, iPhones, iTouches, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, or Symbian platform. If the mobile devices 110 have network (e.g., Internet) connectivity, they may be coupled to the network 190.

The mobile devices 110 include respective user interfaces 105. The user interfaces 105 may be used by mobile device users 102 to interact with the mobile device 110. The mobile devices can also include various input mechanisms (not shown). For example, the input mechanisms can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), and/or combinations or variations of the above. A representative example of a mobile device is shown and discussed in greater detail with reference to FIG. 2.

The terminals 130 can be any system, device, and/or any combination of devices/systems that are able to scan/image symbols using symbol scanners, digital cameras, etc. (collectively, "symbol scanners") The terminals 130 can include, but are not limited to, a kiosk with embedded computer, server desktop, a desktop computer, a computer cluster, a mobile computing device such as a notebook, a laptop computer, a handheld computer, a mobile phone, a smart phone, a PDA, a BlackBerry™ device, a Treo™, and/or an iPhone™, etc. The terminals can also include cash dispensers, receipt printers, customer displays, barcode scanners, and/or debit/credit card readers and processing systems. In one embodiment, one or more of the terminals 130 are coupled to network 190. However, terminals need not necessarily have network connectivity.

As shown, the terminals 130 include a POS terminal 130A, an ATM terminal 130B, and an airport security gate terminal 130C. However, any number of other terminals or kiosks can be included. For example, kiosks could include movie rental kiosks, general information kiosks, bus/ticket purchase kiosks, vending machines, movie theatre access terminals or kiosks, etc.

Further, although shown external to the terminals (i.e., physically distributed) in the example of FIG. 1, any one of the terminals can (and already do) include the symbol scanner 120 as an integrated component of the system. That is, many terminals or kiosks 130 have built-in symbol scanners 120. The terminals 130 also typically include respective terminal interfaces 135. The terminal interfaces 135 can include one or more input devices and a display or other output functionalities to present data to mobile device users 102. For example, mobile device users 102 may be prompted to enter information into a user interface 105 resulting in a symbol being generated. The user 102 may then position the mobile device 110 within proximity of a symbol scanner 120 so that the symbol can be scanned or otherwise read by the symbol scanner 120. The terminal 130 may or may not have a keypad or set of buttons. If no buttons are present, a proximity sensor (not shown) may be provided to cause the symbol scanner to read a bar code presented to the scanner and to thus initiate a transaction.

In one example of operation, the POS terminal 130A is configured to establish a connection with a payment gateway (not shown) and/or other similar systems. The POS terminal 130A forwards transaction details (e.g., purchase information) to the payment gateway. This can be done via an SSL encrypted connection to a payment server (not shown for simplicity) hosted by the payment gateway, for example, though other secure communication protocols may be used (e.g. Financial Information eXchange (FIX), ISO 8583, etc.). In one embodiment, the payment gateway then interacts with the financial institution to verify that a customer can make the purchase, etc. (e.g., customer has necessary funds, credit card has not exceeded limits, credit card not stolen, etc.). This can involve interaction with a security server 150 and/or an account server 160. Once approved, the transaction can take place.

The network 190 can be any collection of distinct networks operating wholly or partially in conjunction to provide connectivity to the mobile devices 110, terminals 130, and/or other systems connected thereto. Communications to and from the mobile devices 110, terminals 130, and/or other systems can be achieved by, an open network, such as the Internet, a private network, such as an intranet and/or the extranet, and/or combinations or variations thereof. The network 190 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

The databases can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package. As shown, the databases are coupled to security servers and/or account servers. However, it is appreciated that in some embodiments, the databases may be alternatively or additionally directly coupled to network and/or distributed across multiple systems.

Representative Mobile Device

Figure 2:
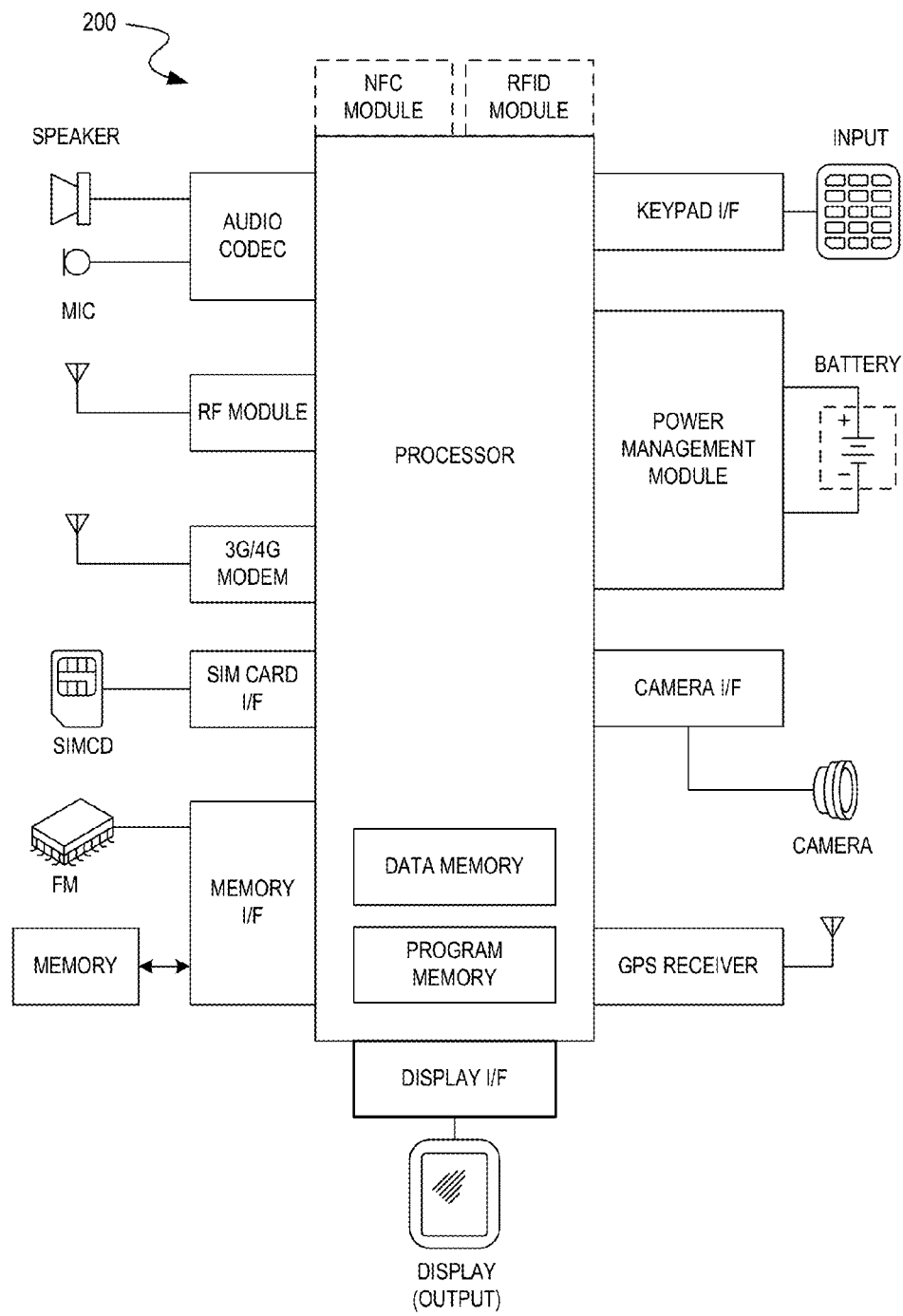
FIG. 2 depicts a block diagram illustrating the components of a representative mobile device in the form of a mobile (or smart) phone.

FIG. 2 depicts a block diagram illustrating example components of a representative mobile device 200 in the form of a mobile (or smart) phone. Various interfaces and modules are shown with reference to FIG. 2, however, as described herein, the mobile device does not require all of modules or functions for communicating private user information from the mobile device to a transaction terminal. That is, although a mobile device 200 is described, a much simpler mobile device can be used to perform the various operations described herein. In fact, any mobile device including a housing, a processor, memory, a display, and some basic input could be used to perform the mobile device operations described herein such as, by way of example and not limitation, "dumb" phones and non-phones (e.g., Apple iTouch and Amazon Kindle devices).

In one embodiment, the program memory includes one or more off-the-shelf symbol generator applications. For example, the QR Barcode Generator from DevPortal has been designed to generate QR Barcodes for URL links, custom text, and phone numbers. The QR Barcode Generator from DevPortal can be currently found here:

https://play.google.com/store/apps/details?id=appinventor.ai_cwilson.QR_Generator&feature=also_installed#?t=W10.

With the QR Barcode Generator from DevPortal a user has the ability to view the barcode or send a link with the barcode via email or Short Message Service (SMS). Other symbol generators are also possible. For example, Data Matrix bar codes, Aztec codes, and QR codes can be used, among others.

As shown, mobile device 200 includes an optional near field communications (NFC) module and an optional RFID module. In one embodiment, the RFID module can be in the form of a read/write RFID tag device or NFC tag. NFC is essentially a close range RFID tag (e.g., in the 13.56 MHz frequency band).

In one example of operation, a customer may want to purchase an item at a POS device or another terminal. To begin the transaction, the customer can access an application on the mobile device (e.g., the customer/user may be required to enter a password for the mobile device and/or the payment icon, etc.) and select, for example, a payment icon. After selecting the payment icon, the mobile device can display to the user a list of credit cards, vendor accounts, debit cards, etc., stored on the mobile device (or multiple icons may be displayed, each associated with a different card, vendor account, debit card, etc.) Once the desired card is selected, the mobile device can either display the symbol (e.g., barcode) on the screen for scanning by the POS or terminal or the mobile device can write this information to a read/write (R/W) RFID tag. The POS device or terminal can scan the barcode or read the RFID tag.

For security purposes, the POS or terminal can subsequently interrogate or solicit additional feedback from the customer. For example, the POS or terminal can ask the customer for a PIN number and/or for answers to one or more challenge questions. Responsive to this inquiry, the customer can subsequently key into the mobile device the PIN and/or the answer to the challenge question. If symbols are used, a new symbol will be generated based on the PIN number and/or the answers to one or more challenge questions. The new symbol will be displayed on the mobile device once the customer indicates completion. If RFID or NFC tags are used, the R/W tag can be written with the new personal information based on the PIN number and/or the answers to one or more challenge questions. The POS or terminal can then read the PIN number and/or answer from the RFID tag.

Generating a Symbol on the Mobile Device

As discussed above, the mobile device can include an application or program that can convert data characters into a bar code symbol for display on the screen. The most straight-forward means of generating a symbol is to call up the program, key in the data, and then execute the program, generally using key strokes or the touch screen.

Alternatively or additionally, pre-assigned flags can be used to call up a combination of the above steps. For instance, an icon on the mobile phone screen (e.g., a picture of an ATM), when touched, can cause the bar code generation program to be activated and a prearranged set of data encoded, for example the user bank account number. It may also be possible to include a series of commands such as account number, password and the amount to be withdrawn. In this way, a single icon touch generates a symbol that when presented to the ATM, results in dispensing a predetermined quantity of cash.

In addition to using the keys and or screen, voice commands can be programmed into the mobile device such that a user can simply say "bar code, ATM, $40" and a symbol will appear on the screen.

Other Applications of the Mobile Device Bar Code

The mobile device with a symbol can potentially replace not only cards, but also keys. For instance, a car equipped with a scanner, can be securely entered and started. One's house and/or place of business can be accessed. Additionally, other devices can be interrogated. For example, a smart refrigerator can be asked "Is enough cheese to make a pizza?". Essentially, anything or device with line or battery power can be enabled with a bar code scanner such that a person can communicate with it using only his or her mobile phone.

Verification of an RF Transmission

When a computing device (e.g., ATM, kiosk, cash register, corporate host computer) is attempting to communicate to an RFID enabled mobile device, there is the inherent difficulty of knowing that the transmission is being made to the correct device. Near Field Communication (NFC) devices rely on their limited range capability to "assume" that the correct device is being read or written to. Longer-range technologies (e.g., Ultra High Frequency (UHF)) are more difficult to singulate correctly (to accurately identify a particular device/tag/card/etc.).

Accordingly, in one embodiment, the mobile device can represent a Tag ID in a bar code for presentation to the computing device. The tag ID is a unique string of bytes that unambiguously identifies an RFID tag. When the bytes are encoded in the bar code on the mobile device, the computing device can read the bar code and match the Tag ID to the RFID chip it is reading or writing to. This match constitutes a handshake that assures the computing device is communicating with the correct mobile device.

Terminals and Readers

Figure 3:
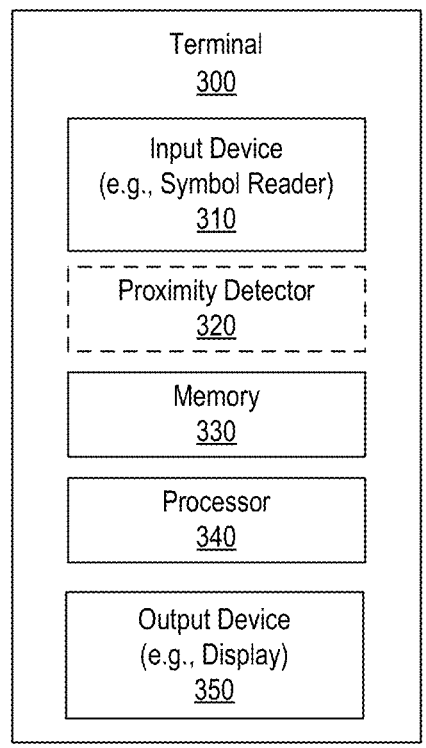
FIG. 3 depicts a block diagram illustrating an example transaction or communication terminal.

FIG. 3 is a block diagram illustrating an example terminal 300. Terminal 300 includes an input device (e.g., symbol reader) 310, an optional proximity detector 320, a memory 330, a processor 340 and an output device 350 (e.g., a display). As discussed above, the terminal 300 can comprise an ATM with a proximity detector 320. The proximity detector can determine when the mobile device is the correct distance from the symbol reader to scan or otherwise read the symbol that is displayed on the mobile device.

The terminal can employ a single camera (e.g., the security camera) to capture an image of the symbol. Further, the symbol reader can be imbedded in or behind a touch screen on the terminal (e.g., the ATM).

In one embodiment, no input mechanism is required for the terminal other than a display. In this case, all input to the terminal is received through NFC or a barcode reader—which as discussed above, can be embedded in the screen.

In one embodiment, the input device 310 receives a first symbol indicating a transaction and the processor 340 (processing device) responsively decodes the first symbol to identify the transaction. The processor 340 then determines that an enhanced security policy is required for authentication of the transaction based, at least in part, on an authentication trigger. The enhanced security policy can include use of one or more challenge questions for the authentication process. The processor 340 then directs the output device (e.g., the display) to request or otherwise solicit a first response to a first challenge question of the one or more challenge questions of the security policy. The input device 310 subsequently receives a second symbol indicating the first response and the processor 340 responsively decodes the second symbol to identify the first response.

The first symbol can be configured to indicate a personal identification number (PIN) that can be used by the processor 340 as part of the authentication process.

In one embodiment, the terminal 300 detects one or more display conditions of a mobile device. The mobile device can include a display for providing the first symbol and the second symbol to the transaction terminal, and the display exhibits the one or more display conditions. The detection can be achieved through hardware sensors (not shown) and/or by the processor 340 via software processing. Detecting the one or more display conditions of the mobile device can include measuring an amount of light generated by the display of the mobile device, and activating the authentication trigger if the amount of light generated does not exceed a threshold. That is, the authentication trigger can be activated if, for example, a symbol read reads a symbol from a piece of paper as opposed to a mobile device with an screen that emits light. Alternatively or additionally, the authentication trigger can be activated based on one or more detected environmental conditions.

As discussed herein, the terminal 300 can determine that the enhanced security policy is required for authentication of the first transaction based, at least in part, on the authentication trigger.

In one embodiment, the terminal 300 can also identify, track, and/or otherwise access a historical transaction pattern associated with a mobile device user allegedly initiating the transaction. The terminal 300 can compare the (requested) transaction to the historical transaction pattern to determine if the transaction falls within a threshold of historical transactions and, if the transaction does not fall within the threshold of historical transactions, the terminal can activate the authentication trigger. In this case, the transaction terminal 300 determines that the enhanced security policy is required for authentication of the first transaction based, at least in part, on the authentication trigger.

The security policy can also be adaptive. For example, the terminal 300 can determine that an escalation of the enhanced security policy is required for authentication of the first transaction. For example, escalation of the enhanced security policy can include using additional challenge questions of the one or more challenge questions. In this case, the processor 340 can direct the output device 350 to solicit (or request) a second response to a second challenge question of the additional challenge questions of the enhanced security policy. Responsive to the solicitation, the input device 310 can receive a third symbol configured to indicate the second response. The processor 340 responsively decodes the third symbol to identify the second response. The symbols utilized by the terminal 300 can include one or more of: an EAN/UPC, an industrial bar code, a 2D bar code, or a QR code.

In one embodiment, the memory 330 stores instructions to be implemented by a processor 340, wherein the instructions, when executed by the processor 340, cause the terminal to 300 to perform the various functions as described herein.

Figure 4:
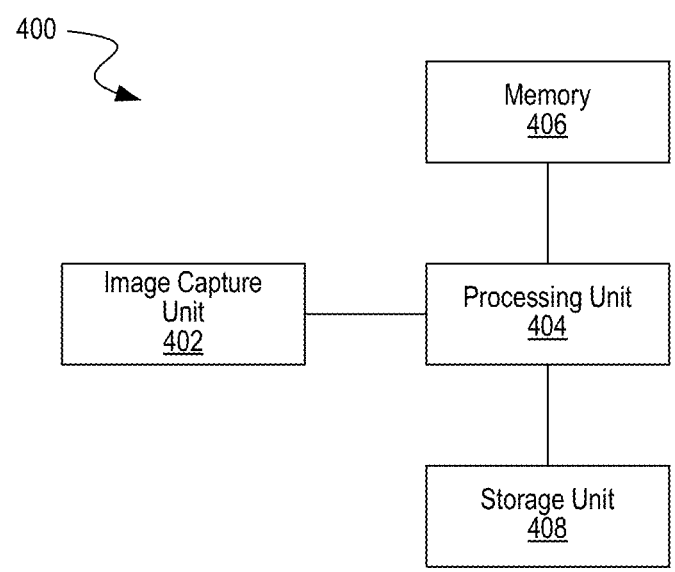
FIG. 4 depicts a functional block diagram of a symbol reader.

FIG. 4 is a functional block diagram of a symbol reader 400. The symbol reader 400 can read or scan a target (e.g., an image, a target region, a signature field, a symbol, a machine-readable symbol, 2D barcodes, data matrices, QR codes, and/or the like codes, etc.). By way of example but not limitation, the symbol reader 400 may be a barcode reader. As shown, the symbol reader 400 includes an image capture unit 402, a processing unit 404, a memory unit 406, and/or a storage unit 408. Additional or fewer units or modules may be included.

The image capture unit 402 can be any combination of hardware components and/or software agents for capturing, reading, retrieving, processing, and/or storing a symbol. For example, the image capture unit 402 can include an electro-optical device such as a laser scanner, rasterizing laser, wand-based optical transducer one- or two-dimensional CCD, semiconductor array, vidicon, or other area imaging device (e.g., 1D imaging device, 2D imaging device) capable of converting received light into electrical signals. The electro-optical device in the image capture unit 402 can also include a light source such as an LED, flash bulb, infrared light source, or other light-emitting element. As used generally herein, the term "reader" or "scanner" refers to any device capable of converting modulated light received from a target into electrical signals. Any convenient and/or known reader may be suitable for use in the present disclosure.

One embodiment of the symbol reader 400 further includes a processing unit 404. The data read from the image capture unit 402 can be input to a processing unit 404. The processing unit 404 can include one or more processors, CPUs, microcontrollers, FPGAs, ASICs, DSPs, or any combination of the above. Data that is input to the symbol reader 400 can be processed by the processing unit 404 and output to display and/or output via a wired or wireless connection to an external computer, such as a host or server computer by way of a communications component.

One embodiment of the symbol reader 400 further includes a memory unit 406 and a storage unit 408. The memory unit 406 and a storage unit 408 are, in some embodiments, coupled to the processing unit 404. The memory unit can include volatile and/or non-volatile memory.

Card Replacement

Figure 5:
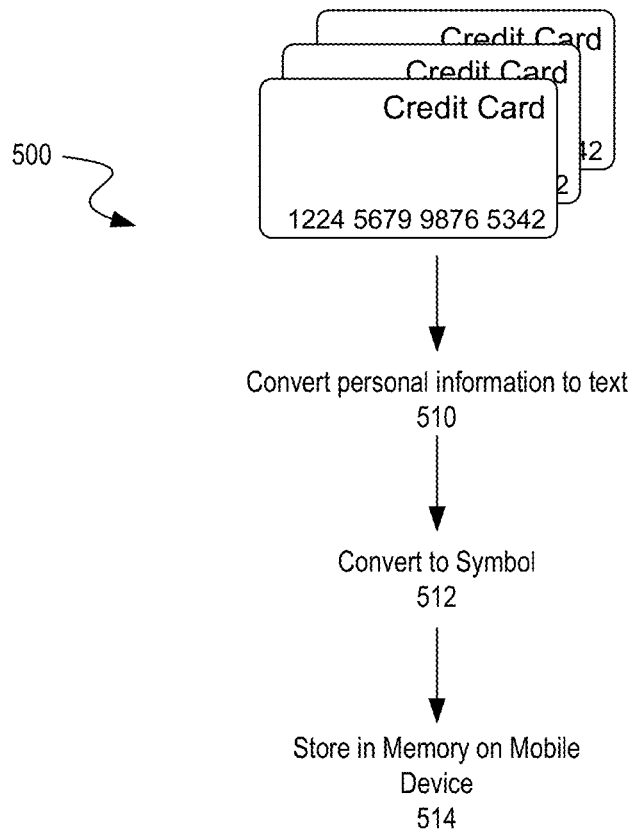
FIG. 5 depicts an example process illustrating conversion of private information into symbols for storage on a mobile device.

FIG. 5 illustrates an example process 500 of converting private information into symbols for storage on a mobile device. At step 510, a user enters the personal information associated with a credit or other type of card. The text could be in any format known in the art including, but not limited to ASCII or Unicode. At step 512, an "off-the-shelf" application converts the text information to a symbol (e.g., a barcode). At step 514, the barcode is stored in memory on the mobile device for later access by a user for display to a terminal.

Any cards can be replaced including static and or smart cards. Static cards currently use bar codes and magnetic stripes. In addition to credit cards, other cards such as membership cards (e.g., zoo, aquarium), loyalty cards (e.g., supermarket), and access fees cards (e.g., bus pass), among other cards, can be replaced and/or otherwise consolidated on a mobile device. Credit cards usually have the CVV and a signature. The magnetic stripe has the card number, the expiry date, and the billing zip code. The generated bar code (on the mobile device) could contain all of the same data as the magnetic strip. Alternatively or additionally, the generated bar code (or another generated bar code) could contain all of the card data including a picture of the signature.

Smart cards contain a chip (e.g., a tamper resistant chip or an RFID chip). All of the data on the chip can be displayed as one or more bar codes. After the bar code is read, the PIN can be entered in the same way as a they are today. Alternatively, the pin could be keyed into the mobile device and a second bar code can be generated and read by a reader device.

Figure 6:
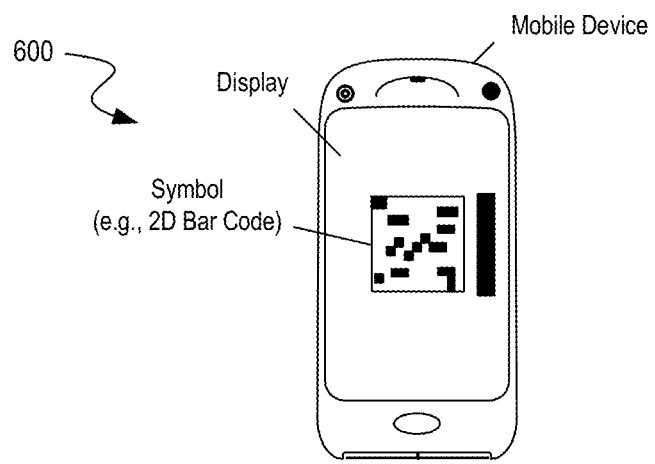
FIG. 6 depicts an example diagram illustrating a mobile device in the form of a portable device (such as a "dumb" phone, a PDA, a smart phone, a Blackberry, iPhone™, iTouch™, and/or a palmtop computer) displaying a symbol generated based on private information.

FIG. 6 illustrates an example of a mobile device in the form of a mobile device or other portable device (such as a PDA, a smart phone, a Blackberry, iPhone, a Kindle, or iTouch, and/or a palmtop computer) displaying a symbol generated based on private information.

Example Methods for Use

Figure 7:
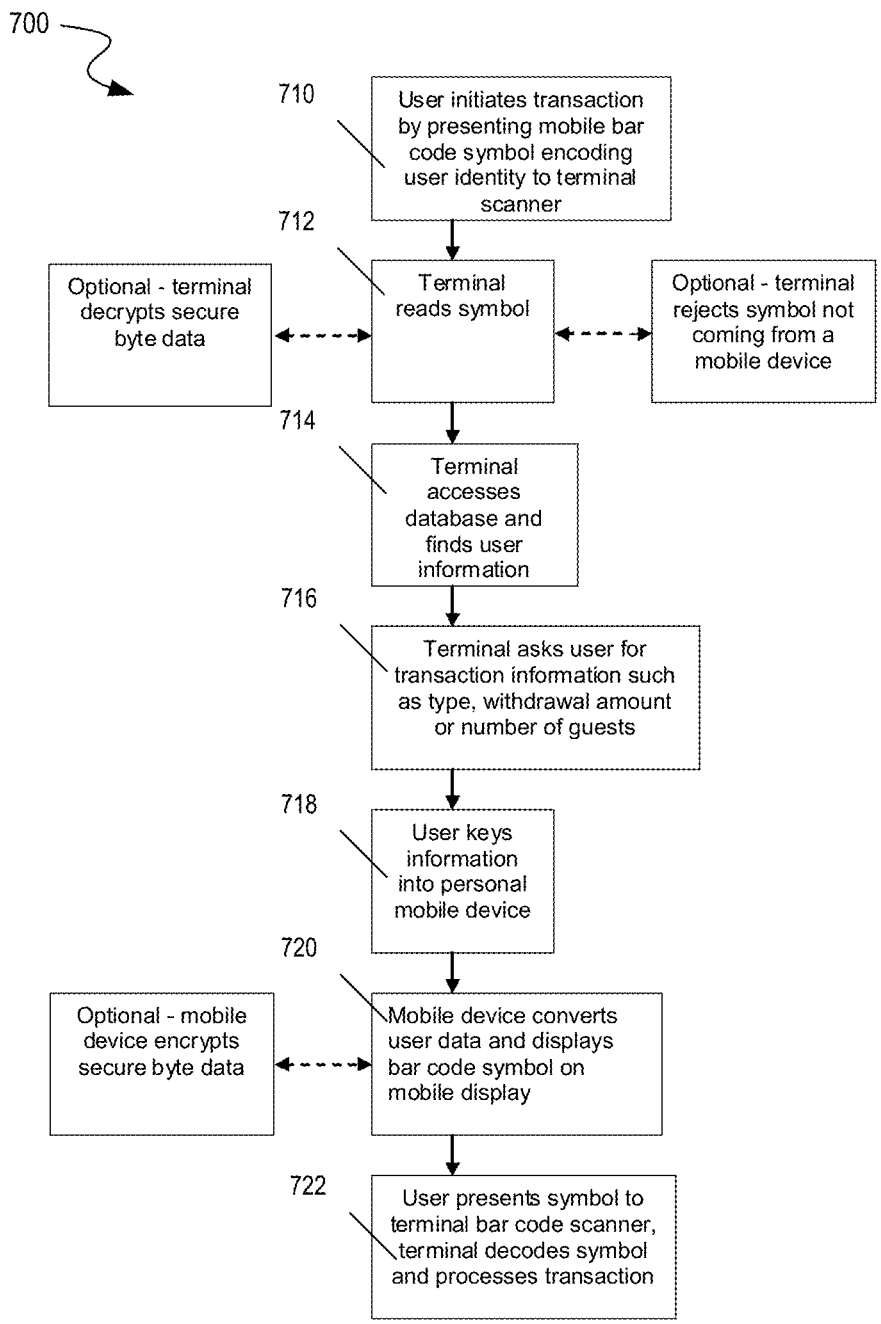
FIG. 7 depicts a flow diagram illustrating an example of the various steps for performing a simple electronic transaction using a mobile bar code symbol.

FIG. 7 is a flow diagram 700 illustrating an example of the various steps for performing a simple electronic transaction using a mobile bar code symbol. More specifically, the flow diagram 700 illustrates the use of a mobile device to communicate simple user information to a transaction terminal using the display of a bar code on the mobile device screen. Various elements of the example environment 100 can individually, or in combination, perform the transaction. The diagram of FIG. 7 is generally self-explanatory based on the above detailed description, but some details will now be provided.

To begin, a mobile device user can optionally key in an unlock code into the mobile device to gain access to the device and perform one or more transactions. The mobile device user can then find and select an icon such as, for example, a payment icon. After selecting the payment icon, the mobile device displays to the mobile device user a list of credit cards stored on the mobile device (or multiple icons may be displayed, each associated with a different card). Once the mobile device user selects a desired card, the mobile device displays a first symbol (e.g., barcode) on the screen for scanning by a terminal. As discussed above, the first symbol can encode a variety of private information.

At step 710, the mobile device user initiates a transaction by presenting the symbol to the terminal scanner. At step 712, the terminal reads or otherwise scans the symbol or barcode. In one or more embodiments, the symbol can be encoded. If the symbol is encoded, the terminal detects the encoding and decodes the symbol so that the personal information in the symbol can be identified. If the symbol is received from a device other than the mobile device, the terminal rejects the symbol or requires additional responses such a challenge questions. For example, if a piece of paper containing a mobile device is presented to the scanner, the scanner may detect that the symbol is printed on paper (e.g., based on light conditions, etc.).

At step 714, the terminal accesses one or more databases and finds the user information. As discussed above, the terminal may include one or more local database. Alternatively or additionally, the terminal may access a network to access one or more remote databases (e.g., at or associated with one or more financial institutions, etc.). At step 716, the terminal asks, interrogates, and/or otherwise prompts the mobile device user for additional transaction information. The request for additional transaction information can be displayed to a user by way of a display at the terminal. In one embodiment, multiple questions can be asked to the user (e.g., type of transaction and amount). The terminal can also indicate a particular delimiter that the mobile device user can user to separate the answers to the multiple questions. Any alphanumeric characters could be used as a delimiter. Delimiters can include, by way of example and not limitation, ";" ":", or a period (".").

In one embodiment, for additional security the information can be presented to the user in the form of a symbol which can be read (or scanned) by the mobile device. In this case, the mobile devices decodes the information and prompts the mobile device user for additional information via a display on the mobile device. In this case, all communication between the mobile device and the terminal can be completed by way of symbols.

Once the information is displayed on the terminal, the mobile device user can respond to the additional transaction information request with one or more responses by keying this information into a screen (or display) on the mobile device at step 718. At step 720, the mobile device converts this additional transaction information into a symbol (optionally encrypting the data) and displays the symbol on the screen of the mobile device. At step 722, the mobile device user presents the screen to the terminal so that it can be scanned and processed by the terminal.

As discussed above, the invention facilitates the communication of private information between a mobile device user operating a mobile device and a transaction terminal. The mobile device does not require connectivity (e.g., a web connection), a camera, or an RF capture device.

In one embodiment, the mobile device converts private information (e.g., credit card, membership card, concert ticket, loyalty card) into a bar code that is stored in the mobile device for later display. When a member wishes to enter a venue, he or she calls up the symbol and it is scanned to allow entry. Thus, this application replaces the bar code on a ticket or card with one that is stored on a mobile device.

One aspect of this invention is to increase the security of these transactions. Another aspect of this invention is to allow a paid observer (e.g., the ticket taker employed by the venue) to require an arbitrarily high level of security. Another aspect of this invention is to facilitate entirely automated transactions with high security. Accordingly, at the most basic level, the mobile device user only requires software that can convert text into a bar code symbol that is displayed on the mobile device screen.

In a representative embodiment, this invention utilizes a bar code scanner to facilitate the entry of data into a terminal. For instance, a user wishes to withdrawal money from his or her account. The ATM does not require a card reader, keypad, camera or other expensive device currently employed. The ATM needs only a screen and a bar code scanner which can be safely placed behind "bullet proof" glass. An ATM can be envisioned without any other entry method except the bar code scanner, not even a touch screen. A side benefit to the invention is the development of a class of ATM devices that is nearly indestructible and which can be completely sealed from the elements.

In this example, the user calls up his banking symbol on the mobile device. The symbol can encode simply the data of the user account or can be more sophisticated such as encoding only encrypted bytes. Since a "bad guy" could be using a stolen phone or a printed image of the bar code symbol, greater security is desirable. The scanner can be configured only to be able to read symbols displayed on mobile devices (i.e., symbols must produce their own light so that a paper symbol would be unreadable).

Figure 8:
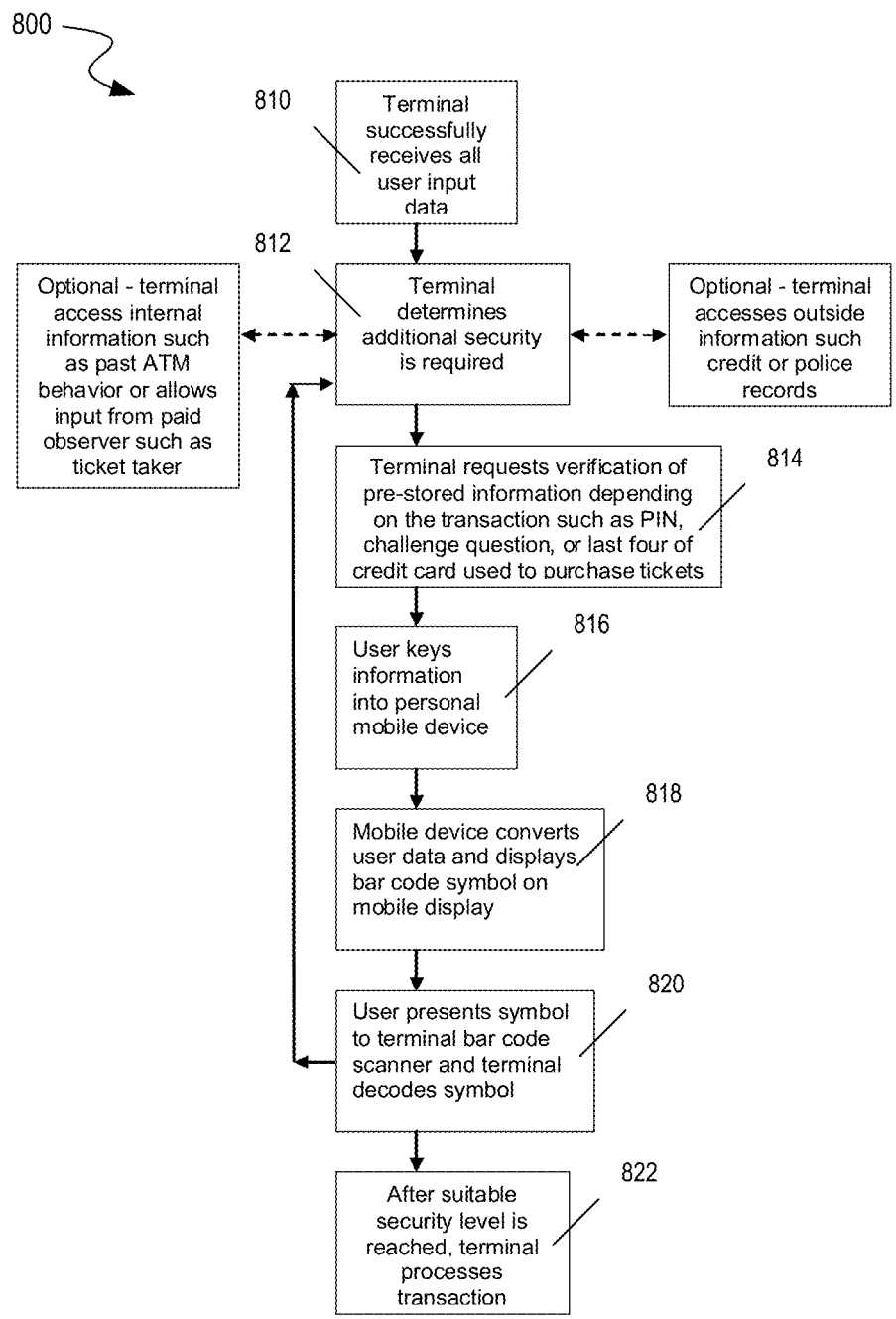
FIG. 8 depicts a flow diagram illustrating an example of the various steps for performing a simple electronic transaction using a mobile bar code symbol and a terminal with enhanced security.

In one embodiment, if the symbol does not produce sufficient light (e.g., if the symbol reader detects a measure of light from the symbol that is less than a threshold), then enhanced security, as described with respect to FIG. 8, may be triggered. Alternatively or additionally, a terminal may detect other environmental conditions that can be used, at least in part, to trigger enhanced security. As discussed above, the enhanced security can include one or more challenge questions, etc. The enhanced security can be adaptive. For example, the number and difficulty of the challenge questions can be selected based, at least in part, on the detected environmental conditions and/or mobile device conditions and/or historical transaction patterns.

FIG. 8 is a flow diagram 800 illustrating an example of the various steps for performing a simple electronic transaction using a mobile bar code symbol and a terminal with enhanced security. More specifically, the flow diagram 800 illustrates the terminal asking one or more security questions and the user responding by creating bar code symbols on his mobile device and presenting the device to the terminal. Various elements of the example environment 100 can individually, or in combination, perform the enhanced security. The diagrams of FIG. 8 is generally self-explanatory based on the above detailed description, but some details will now be provided.

To begin, at step 810, the terminal successively received input from the mobile device. For example, a bank terminal can ask for a pin number. The user can then enter the number securely on his phone and the phone converts the data into a bar code symbol or encrypts the data and displays the bytes in a bar code symbol. The user places the phone next to the terminal and the bar code is read. However, PIN numbers are notoriously easy to steal or forge. Accordingly, the use of "challenge questions" can be utilized at the terminal (i.e., automatic on-the-spot adaptive transaction security).

In one embodiment, a financial entity collects personal information typically only known to a customer and importantly, not necessary to be written down or specifically remembered. Such challenge questions are typically memories from a customer's past such as "What was the name of your first pet?" or "What is your grandmother's middle name?" An arbitrarily large number of these challenge questions can be assembled and used depending on the level of security desired to provide security at the level of biometrics without privacy invasion or expensive technology.

At step 812, the terminal determines that additional security is required. The security can be increased or decreased on-the-fly based on a variety of triggers. For example, if the terminal detects a strange input (e.g., low light on a barcode) this could trigger selection of a security policy or an escalation of a security policy (e.g., additional security questions). A low light condition might occur if, for example, a printed piece of paper having a barcode printed thereon is being used to attempt to mimic the barcode on the phone.

At step 814, the terminal request verification of pre-stored information based on the transaction. Depending on the transaction, the terminal may access one or more networks to determine what verification information to ask. For example, an ATM terminal may ask for a PIN automatically. Conversely, if a challenge question is needed, the terminal may need to request the challenge question from one or more remote or local databases. The terminal can then ask the question by displaying the question to the mobile device user on the terminal.

At step 816, the mobile device user enters the answer to the questions securely on his mobile device (e.g., phone) and, at step 818, the mobile device converts the data into a bar code symbol or encrypts the data and displays the bytes in a bar code symbol. At step 820, the mobile device user places the phone next to the terminal and the bar code is read.

At step 822, the terminal can then ask a different challenge question, and can continue to do so for an arbitrary number of times based on user behavior or information in the system (bank's) possession (e.g., value of the withdrawal, multiple tries at entering a correct symbol, a long gap between use of an ATM, poor credit, recent police record). Only when an arbitrarily large series of correct challenge questions is answered is the secure transaction performed.

Figure 9:
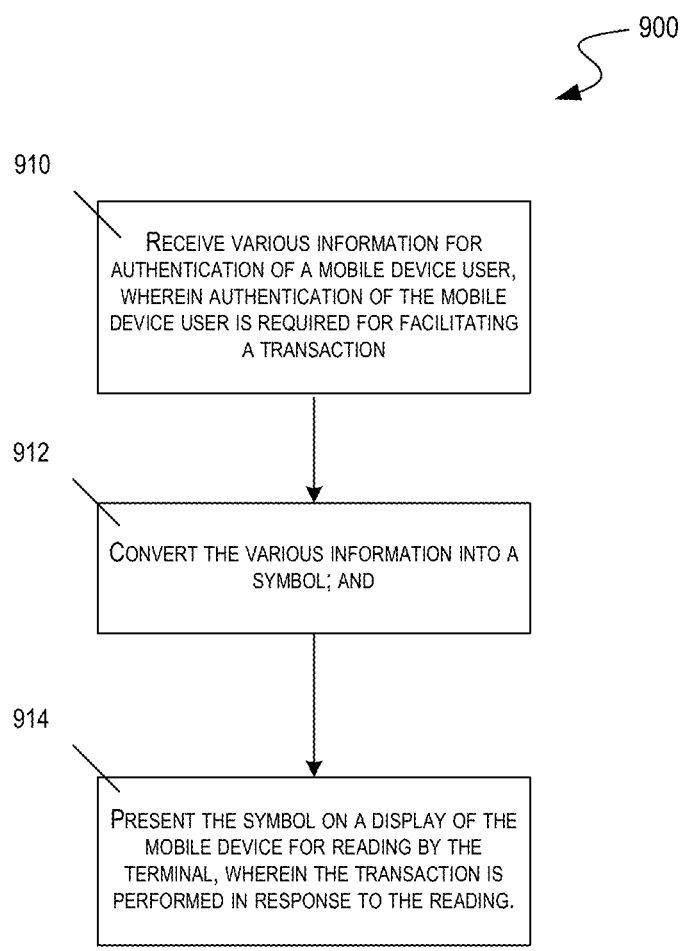
FIG. 9 depicts a flow diagram illustrating an example of the various steps for performing a simple electronic transaction using a mobile bar code symbol.

FIG. 9 is a flow diagram 900 illustrating an example of the various steps for performing a simple electronic transaction using a mobile bar code symbol. More specifically, the flow diagram 900 illustrates the mobile device gathering information, and successively converting the information into symbols (mobile bar code symbols) for presentation and/or display for scanning or otherwise reading by a symbol scanner. A mobile device of the example environment 100 can perform the steps described with respect to FIG. 9. The diagram of FIG. 9 is generally self-explanatory based on the above detailed description, but some details will now be provided.

To begin, the mobile device can receive information indicating a transaction. The mobile device can convert the information indicating the transaction into a transaction symbol and present the transaction symbol on the display of the mobile device for reading by the terminal. Information to authenticate the mobile device user can subsequently be requested or solicited by the terminal responsive to the reading of the transaction symbol.

At step 910, a mobile device receives various information for authentication of the mobile device user. The authentication of the mobile device user is required for facilitating a transaction. Some or all of the information can be requested by a display of a terminal device. At step 912, the mobile device converts the various information into one or more symbols. Optionally, some or all of the information can be encoded for extra security.

In one embodiment, the information indicating the transaction can include a personal identification number (PIN) used for the authentication of the mobile device user. In this case, the various information for authentication of the mobile device user comprises additional authentication information that can include one or more challenge questions.

Lastly, at step 914, the mobile device presents the symbol on a display of the mobile device for reading by the terminal. The transaction is performed in response to the reading. That is, once the mobile device is authenticated by a terminal (by way of the symbol), the transaction can occur.

Figure 10:
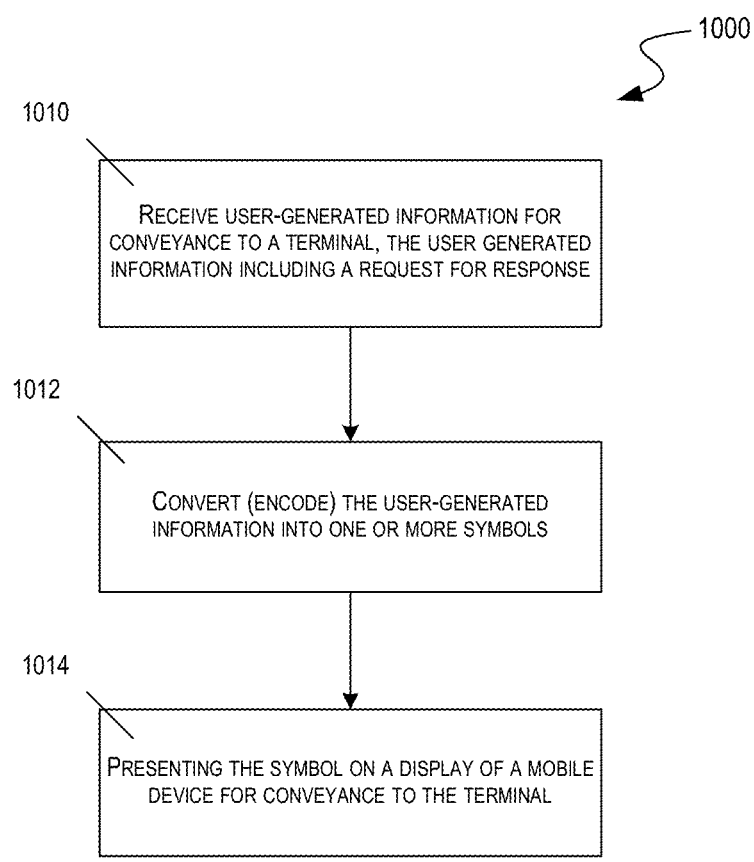
FIG. 10 depicts a flow diagram illustrating an example of the various steps for performing a simple electronic transaction using a mobile bar code symbol.

FIG. 10 is a flow diagram 1000 illustrating an example of the various steps for performing a simple electronic transaction using a mobile bar code symbol. More specifically, the flow diagram 1000 illustrates the mobile device communicating a question to terminal such as, for example, a smart refrigerator.

To begin, the mobile device receives user-generated information for conveyance to a terminal. The user-generated information can include a request for response. For example, the user-generated information can include a question. For example, the user-generated information may include a question to a smart refrigerator "Is there enough cheese for a pizza?". The smart refrigerator can scan the symbol, process the information and determine a response. The response can be displayed to a mobile device user by way of a display on the terminal (e.g., the smart refrigerator). Alternatively or additionally, the terminal can generate a response symbol that is read or scanned by the mobile device.

Automated Transaction Machine

In one embodiment, an automated transaction machine including a display screen and a symbol scanner is disclosed. The symbol scanner is configured to read a symbol through at least a portion of the display screen, and the symbol is presented to the symbol scanner via a display on a mobile device.

In one embodiment, the automated transaction machine can further include a processing device configured to decode the symbol to identify a transaction, determine an authentication trigger, and select an adaptive security policy for authentication of the transaction based, at least in part, on the authentication trigger, wherein the adaptive security policy includes using one or more challenge questions for the authentication.

ADDITIONAL EXAMPLES

Example #1

ATM Process

1. User keys the unlock code into his phone
2. User calls up his ATM bar code
3. User presents the bar code to the ATM
4. The ATM asks for the PIN
5. The PIN is keyed into the phone and the second bar code is displayed Example #2

High Security ATM Process

1. ATM detects a security suspicion: that the bar code symbol is printed on paper, that another withdrawal occurred recently, etc.
2. ATM asks a "challenge question" like: "What is your Father's middle name?"
3. The user keys the answer into his phone and displays a third bar code Although not discussed some or all of the data can be encrypted in any of the processes discussed herein

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

The teachings of the invention provided herein can be applied to other systems, not necessarily the system described above. The elements and acts of the various examples described above can be combined to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims While certain aspects of the invention are presented below in certain claim forms, the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for", but use of the term "for" in any other context is not intended to invoke treatment under 35 U.S.C. § 112, ¶6.) Accordingly, the applicant reserves the right to add additional claims after filing the application to pursue such additional claim forms for other aspects of the invention.

I claim:

1. A terminal comprising:
    a symbol scanner configured to scan a first machine readable indicia displayed on a display screen of a mobile device,
    a processor configured to:
        decode the first machine readable indicia to retrieve a user information; and
        determine if an authentication trigger is to be activated based on at least one of the decoding of the first machine readable indicia and the retrieved user information;
        when the authentication trigger is activated at the terminal:
            scan and decode a second machine readable indicium displayed on the display screen of the mobile device, wherein the second machine readable indicia comprises a response from a user of the mobile device for a challenge question displayed on the terminal; and
            analyze the decoded second machine readable indicium to determine if the response in the second machine readable indicia meets a predetermined criterion.

2. The terminal of claim 1, wherein the activation of the authentication trigger corresponds to activation of enhanced security policy, wherein in response to the activation of enhanced security policy, one or more challenge questions are displayed on the terminal.

3. The terminal of claim 1, wherein the processor of the terminal is further configured to:
measure an amount of light generated by the display of the mobile device; and
activate the authentication trigger when the amount of light generated is less than a threshold.

4. The terminal of claim 1, wherein the user information comprises at least one of a transaction information, wherein the transaction information corresponds to a transaction initiated by the user.

5. The terminal of claim 4, wherein the processor is configured to:
identify a historical transaction pattern associated with the mobile device user initiating the transaction;
compare the transaction to the historical transaction pattern to determine if the transaction falls within a threshold of historical transactions; and
activate the authentication trigger if the transaction information does not fall within the threshold of historical transactions.

6. A terminal comprising:
a symbol scanner configured to scan a first machine readable symbol displayed on a display screen of a mobile device;
a processor configured to:
decode the first machine readable symbol to retrieve a user information;
determine that an adaptive security policy is required for authentication based, at least in part, on an authentication trigger; and
when the enhanced security policy is determined to be required:
determine if a response in the second machine-readable symbol scanned from the symbol scanner meets predetermined criteria, wherein the second machine-readable symbol comprises a response from a user of the mobile device for a challenge question displayed on the terminal;
authenticate the mobile device when the response meets the predetermined criteria.

7. The terminal of claim 6, wherein the adaptive security policy comprises using one or more challenge questions for authentication.

8. The terminal of claim 6, further comprising:
a proximity detector configured to detect when the mobile device is located within a predefined scanning proximity of the terminal; and
the symbol scanner configured to automatically scan the first machine readable symbol and second machine readable symbol when the mobile device is within a predefined scanning proximity of the terminal.

9. A method performed by a terminal, the method comprising:
scanning by a symbol scanner of the terminal a first symbol displayed on a display screen of a mobile device,
decoding, by a processor the first symbol to retrieve user information;
determining if an authentication trigger is to be activated based on at least one of the decoding of the first symbol and the retrieved user information;
upon activation of the authentication trigger at the terminal:
displaying, by the terminal, a first challenge question;
scanning, by the symbol scanner, a second symbol, wherein the second symbol is a response to the first challenge question received at the mobile device from a user;
decoding, by a processor the second symbol to retrieve the response;
determining, by the processor if the response meets a predetermined criteria.

10. The method of claim 9, wherein the activation of the authentication trigger corresponds to activation of enhanced security policy, wherein in response to the activation of enhanced security policy, one or more challenge questions are displayed on the terminal.

11. The method of claim 9, wherein the terminal displays other challenge questions based on the retrieved response.

12. The method of claim 9 further comprising:
measuring an amount of light generated by the display of the mobile device; and
activating the authentication trigger when the amount of light generated is less than a threshold.

13. The method of claim 9, wherein the retrieved user information comprises at least one of a transaction information, wherein the transaction information corresponds to a transaction initiated by the user.

14. The method of claim 9 further comprising
identifying, by the terminal, a historical transaction pattern associated with a mobile device user initiating the transaction;
comparing, by the terminal, the transaction to the historical transaction pattern to determine if the transaction falls within a threshold of historical transactions; and
activate, by the terminal, the authentication trigger if the transaction does not fall within the threshold of historical transactions.

15. The method of claim 9, wherein determining if an authentication trigger is to be activated based on at least one of the decoding of the first symbol and the retrieved user information comprises:
measuring an amount of light generated by the display of the mobile device; and
activating the authentication trigger when the amount of light generated by the display is less than a threshold.

* * * * *